(12) United States Patent
Howard et al.

(10) Patent No.: US 8,098,060 B1
(45) Date of Patent: Jan. 17, 2012

(54) SYSTEMS, METHODS AND APPARATUS FOR POSITION SENSOR DIGITAL CONDITIONING ELECTRONICS

(75) Inventors: David E. Howard, Hazel Green, AL (US); Dean C. Alhorn, Huntsville, AL (US); Dennis A. Smith, Athens, AL (US); Kenneth R. Dutton, Athens, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 806 days.

(21) Appl. No.: 12/173,318

(22) Filed: Jul. 15, 2008

(51) Int. Cl.
 *G01B 7/14* (2006.01)
(52) U.S. Cl. .................................. 324/207.15
(58) Field of Classification Search . 324/207.15–207.17
 See application file for complete search history.

(56) References Cited

U.S. PATENT DOCUMENTS

| | | | |
|---|---|---|---|
| 4,561,304 A * | 12/1985 | Max | 73/247 |
| 5,367,459 A | 11/1994 | Shtarkman et al. | |
| 6,191,550 B1 | 2/2001 | Yoshihara | |
| 6,246,228 B1 | 6/2001 | Alhorn et al. | |
| 6,313,624 B1 | 11/2001 | Alhorn et al. | |
| 6,373,219 B1 | 4/2002 | Obara et al. | |
| 6,480,007 B1 | 11/2002 | Beck et al. | |
| 6,577,957 B2 | 6/2003 | Jujimoto et al. | |
| 6,615,152 B2 | 9/2003 | Fujimoto et al. | |
| 6,762,600 B2 | 7/2004 | Khalfin | |
| 6,925,380 B1 | 8/2005 | Harrison, Jr. et al. | |
| 6,925,401 B2 | 8/2005 | Kameya | |
| 7,012,399 B2 | 3/2006 | Suzuki | |
| 2005/0030049 A1 | 2/2005 | Chertok | |
| 2007/0194781 A1* | 8/2007 | Zhitomirskiy | 324/207.17 |

* cited by examiner

*Primary Examiner* — Bot Ledynh
(74) *Attorney, Agent, or Firm* — Michael G. Smith; James J. McGroary

(57) ABSTRACT

Systems, methods and apparatus are provided through which in some implementations determine the amplitude of an amplitude modulated signal, modulated by the position of an object being sensed. In some aspects, the apparatus accepts an excitation signal and the amplitude modulated signal and divides the amplitude modulated by the excitation signal to produce an output signal that is proportional to the position of the object being sensed. In other aspects, the division is performed only when the excitation signal is non-zero, such as close to the peaks in the excitation signal. In other aspects, the excitation signal and amplitude modulated signal are degraded due to an air gap and the degraded signals are used to correct for amplitude fluctuations due to the air gap, and produce an output signal, tolerant of the air gaps, that is proportional to the position of the object being sensed.

22 Claims, 7 Drawing Sheets

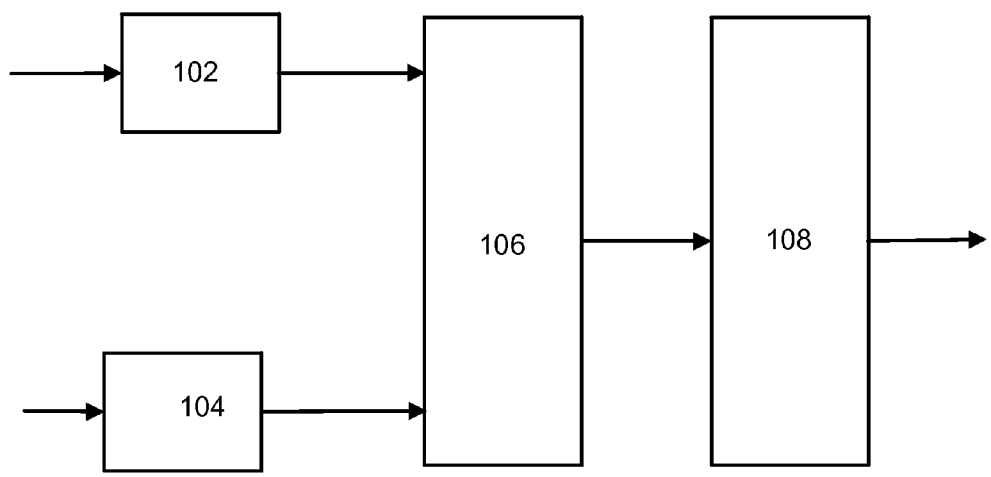
FIG. 1
 100

SYSTEMS, METHODS AND APPARATUS FOR POSITION SENSOR DIGITAL CONDITIONING ELECTRONICS

ORIGIN OF THE INVENTION

The invention described herein was made in the performance of work under a NASA contract and by an employee of the United States Government and is subject to the provisions of Section 305 of the National Aeronautics and Space Act of 1958, as amended, Public Law 85-568 (72 Stat. 435, 42 U.S.C. §2457), and may be manufactured and used by or for the Government for governmental purposes without the payment of any royalties thereon or therefore.

FIELD OF THE INVENTION

This invention relates generally to position sensors and more particularly to single coil absolute position sensors and inductive gap sensors.

BACKGROUND OF THE INVENTION

Single coil absolute position sensors that are used to sense the position of an object require an excitation signal that is of the form of a constant frequency sinusoidal wave. The output of the sensor is an amplitude modulated signal, modulated by the position of the object. The single coil absolute position sensor usually includes an excitation coil, and a sensor component. The sensor component is typically affixed to the object that is being sensed, whereas the excitation coil is not affixed to the object that is being sensed. Additionally, the excitation coil and the object being sensed are free to move relative to one another. In some aspects, the position of the excitation coil is fixed while the object being sensed and the affixed sensor component are free to move in a linear motion or in an angular motion. In other aspects, the position of the object being sensed and the affixed sensor component is fixed whereas the excitation coil is free to move in a linear motion or angular motion.

The function of the excitation coil is to transmit the excitation signal to the sensor component. The sensor component receives the excitation signal and uses this received excitation signal to output an amplitude modulated signal, modulated by the position of the object being sensed.

The amplitude modulated signal that is output by the single coil absolute position sensor may be demodulated to recover the position of the object being sensed. Conventional demodulator circuits may perform this demodulation of the amplitude modulated signal, but their performance is typically very sensitive to any variations in the amplitude of the excitation signal. Such variations in the amplitude of the excitation signal are quite common, and may result from degradation in the signal due to the air gap between the source of the excitation signal and the demodulator circuit.

Conventional demodulator circuits are usually composed of many individual components which each act on the excitation signal and the amplitude modulated signal. These extensive stages of electronics induce more noise and error in the demodulated signal. Additionally, conventional demodulator circuits yield a demodulated signal that contains ripples.

For the reasons stated above, and for other reasons stated below which will become apparent to those skilled in the art upon reading and understanding the present specification, there is a need in the art for a demodulator apparatus that is insensitive to variations in the amplitude of the excitation signal, does not induce significant noise in the demodulated signal due to extensive stages of processing of the signals, and do not include ripples in the demodulated output signal. There is also a need for improved methods of accurately sensing the position of an object.

BRIEF DESCRIPTION OF THE INVENTION

The above-mentioned shortcomings, disadvantages and problems are addressed herein, which will be understood by reading and studying the following specification.

Systems, methods and apparatus are provided through which an amplitude modulated signal, modulated by the position of an object being sensed, is demodulated such that the demodulation system, method and apparatus is insensitive to variations in the amplitude of an excitation signal, does not induce significant noise in the demodulated signal due to extensive stages of electronics to process the signals, and does not induce ripples in the demodulated output signal.

In one aspect, an apparatus to sense the position of an object includes a first receiver that is operable to receive an excitation signal, a second receiver that is operable to receive an amplitude modulated signal, modulated by the position of an object being sensed, and a demodulator that is operable to demodulate the amplitude modulated signal from the received excitation signal and is further operable to output a signal that is proportional to the position of the object being sensed.

In another aspect, an apparatus to sense the position of an object being sensed includes a receiver operable to receive an excitation signal, a position sensing device which is operable to output an amplitude modulated signal, modulated by the position of the object being sensed, a demodulator that is operable to demodulate the amplitude modulated signal from the received excitation signal and is further operable to output a signal that is proportional to the position of the object being sensed, and an excitation coil which is free to move relative to the rest of the apparatus.

In yet another aspect, a method to determine the position of an object being sensed includes receiving an excitation signal, receiving an amplitude modulated signal, modulated by the position of the object being sensed, and demodulating the amplitude modulated signal by dividing the amplitude modulated signal by the excitation signal to produce an output signal that is proportional to the position of the object being sensed.

Apparatus, systems, and methods of varying scope are described herein. In addition to the aspects and advantages described in this summary, further aspects and advantages will become apparent by reference to the drawings and by reading the detailed description that follows.

BRIEF DESCRIPTION OF THE DRAWINGS

FIG. 1 is a diagram illustrating a system-level overview of an implementation to sense the position of an object.

DETAILED DESCRIPTION OF THE INVENTION

Figure 2:
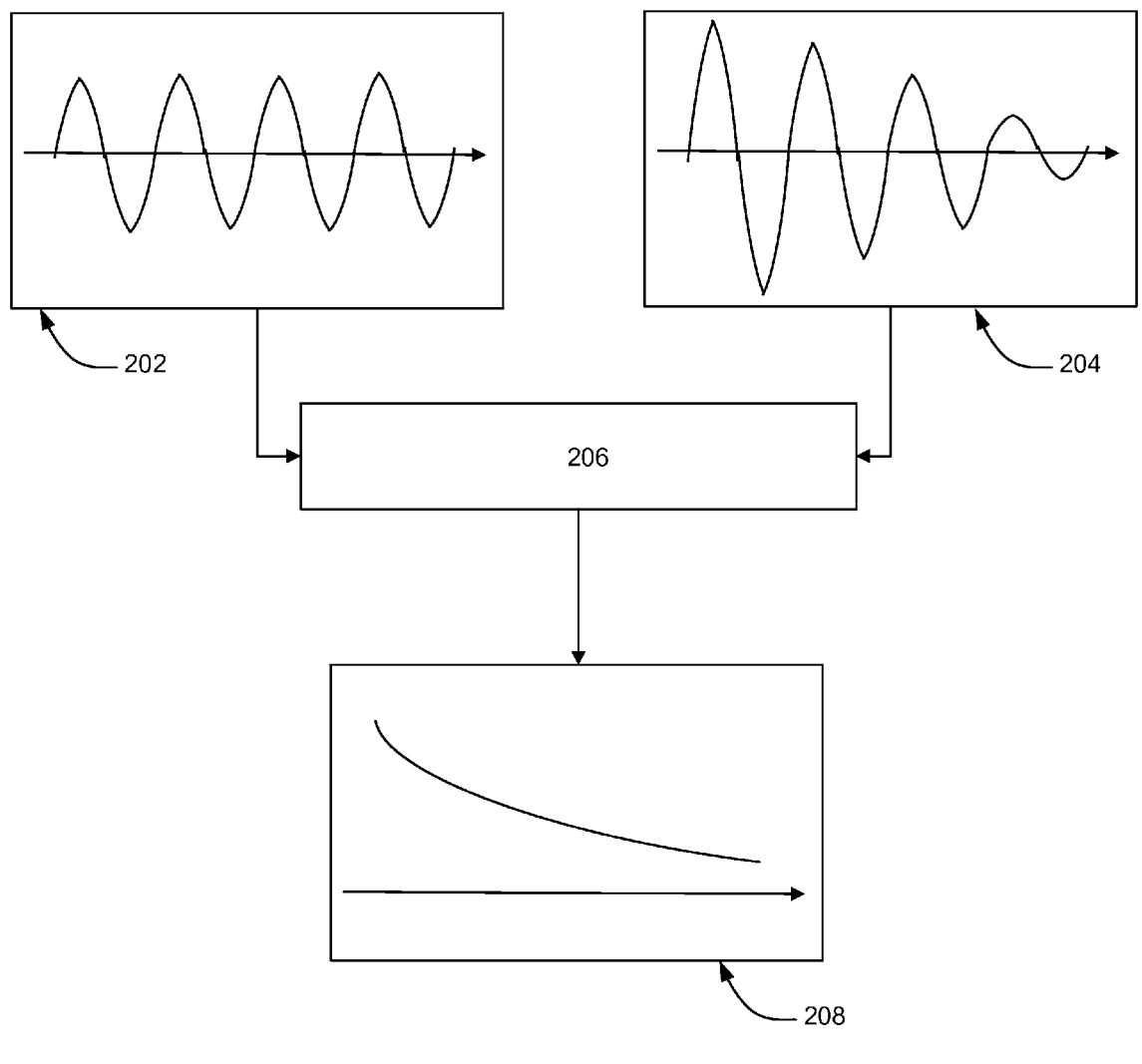
FIG. 2 is a diagram of apparatus, according to an implementation to demodulate an amplitude modulated signal, modulated by the position of an object, from an excitation signal according to an implementation.

In the following detailed description, reference is made to the accompanying drawings that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

The detailed description is divided into four sections. In the first section, a system level overview is described. In the second section, apparatus of implementations are described. In the third section, implementations of methods are described. Finally, in the fourth section, a conclusion of the detailed description is provided.

System Level Overview

FIG. 1 is a cross section block diagram of an overview of a system to sense the position of an object. System 100 solves the need in the art to demodulate an amplitude modulated signal, such that significant noise is not induced in the demodulated output signal, and ripples are not induced in the demodulated output signal.

System 100 includes a first receiver 102 that is operable to receive an excitation signal, a second receiver 104 that is operable to receive an amplitude modulated signal, modulated by the position of the object being sensed, an analog to digital converter 106 that is operable to sample the excitation signal and the amplitude modulated signal at exactly the same times when the excitation signal is non-zero, and a micro-controlled 108 that is operable to divide the amplitude modulated signal by the excitation signal, and further operable to output a signal that is proportional to the position of the object being sensed.

The system level overview of the operation of an implementation is described in this section of the detailed description. In some aspects an apparatus to sense the position of an object includes a first receiver that is operable to receive an excitation signal, a second receiver that is operable to receive an amplitude modulated signal, modulated by the position of the object being sensed, and a demodulator that is operable to demodulate the amplitude modulated signal from the received excitation signal, and further operable to output a signal that is proportional to the position of the object being sensed.

In other aspects, the demodulator includes an analog to digital converter that is operable to sample the excitation signal and the amplitude modulated signal at exactly the same time when the excitation signal is non-zero, and a micro-controller that is operable to divide the amplitude modulated signal by the excitation signal. In other aspects, the analog to digital converter includes an analog to digital converter with a dual simultaneously sampled sample/hold circuit. This provides a method to sample and hold the excitation signal and the amplitude modulated signal at the same moment in time.

In yet other aspects, the analog to digital converter is operable to sample the excitation signal and amplitude modulated signal at times close to the time corresponding to the peak amplitude of the excitation signal. As a result the signal to noise ratio in the samples is reduced since the rate of change of an arbitrary sinusoidal signal is less at or near the peak of the arbitrary sinusoidal signal.

While the system 100 is not limited to any particular receivers, demodulator circuits, analog to digital converters, or micro-controllers, for sake of clarity a simplified demodulator circuit which includes an analog to digital converter and micro-controller is described.

Apparatus Embodiments

In the previous section, a system level overview of the operation of an implementation was described. In this section, the particular apparatus of such an implementation are described by reference to a series of diagrams.

FIG. 2 is a cross section block diagram of apparatus 200 to demodulate an amplitude modulated signal, modulated by the position of an object, from an excitation signal according to an implementation. Apparatus 200 solves the need in the art to demodulate an amplitude modulated signal, such that significant noise is not induced in the demodulated output signal, and ripples are not induced in the demodulated output signal.

Apparatus 200 includes a first receiver 202 that is operable to receive an excitation signal, a second receiver 204 that is operable to receive an amplitude modulated signal, modulated by the position of an object, a demodulator 206 that is operable to demodulated the amplitude signal from the received excitation signal, and is further operable to output a signal that is proportional to the position of the object, and an output buffer 208 that is operable to receive the demodulated output signal that is proportional to the position of the object being sensed.

In some aspects, the excitation signal is a constant frequency periodic signal, and in other aspects, the excitation signal is a constant frequency sinusoidal signal of the form K*Sin(wt), where K is a constant value, w is the frequency of the sinusoidal signal, t is a variable representing time, and Sin(•) represents the sinusoidal function applied to the arguments within the parentheses.

In some aspects, the amplitude modulated signal is a constant frequency periodic signal modulated whose amplitude is modulated by the position of an object being sensed. In other aspects, the amplitude modulated signal is a constant frequency sinusoidal signal whose amplitude is modulated by the position of an object being sensed, where the amplitude modulated signal is of the form K1(t)*K*Sin(wt), where K1(t) is the position of the object being sensed, K is a constant value, w is the frequency of the sinusoidal signal, t is a variable representing time, and Sin(•) represents the sinusoidal function applied to the arguments within the parentheses.

In some aspects, determining the position of the object being sensed includes determining the value of K1(t) by using a demodulator circuit to divide the amplitude modulated signal by the excitation signal resulting in a normalized, ripple free signal that is proportional to the position of the object being sensed.

Figure 3:
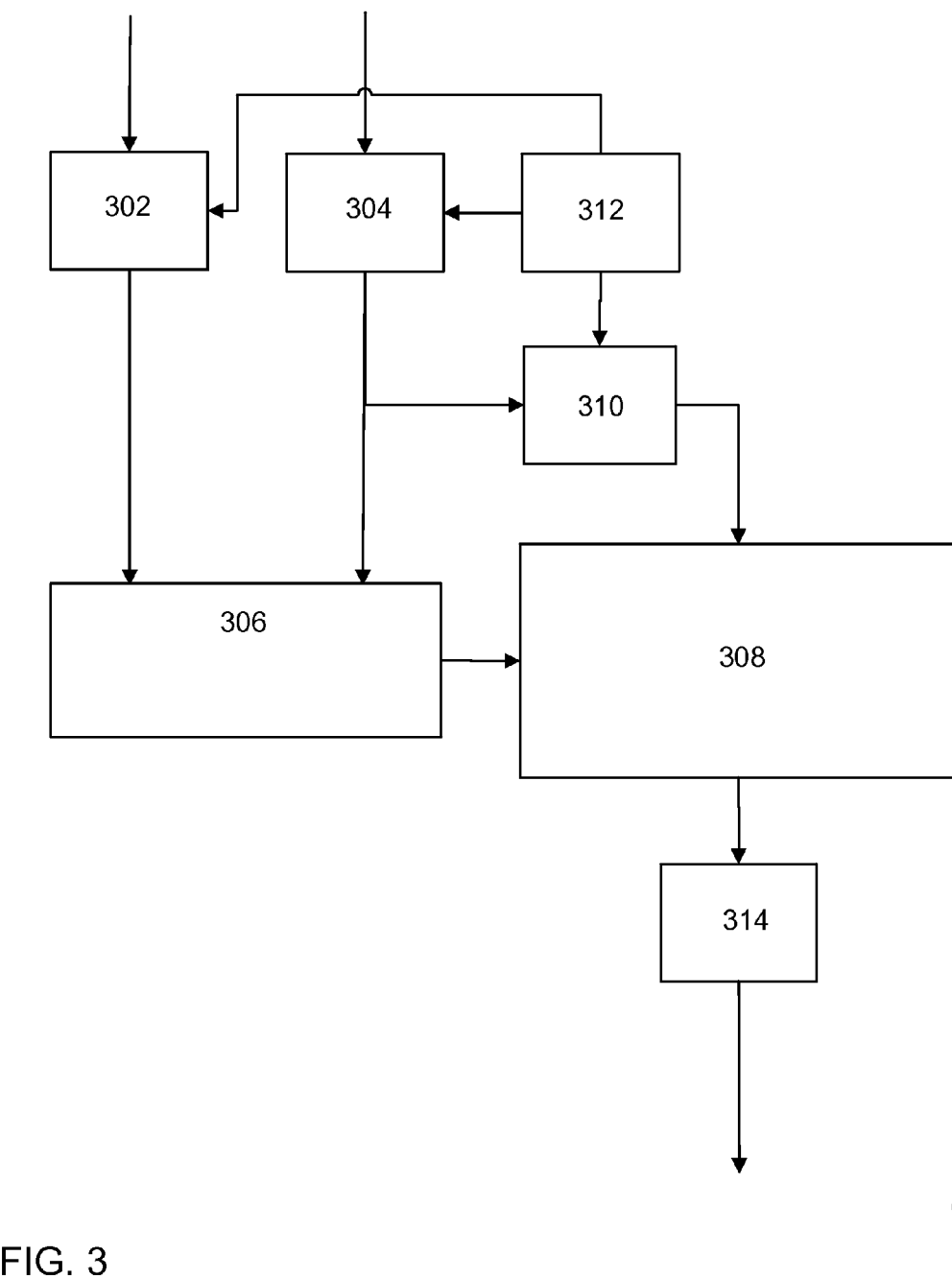
FIG. 3 is a diagram of apparatus, according to an implementation to receive, sample and demodulate an amplitude modulated signal, modulated by the position of an object, from an excitation signal according to an implementation.

FIG. 3 is a cross section block diagram of apparatus 300 to receive, sample and demodulate an amplitude modulated signal, modulated by the position of an object, from an excitation signal according to an implementation. Apparatus 300 solves the need in the art to demodulate an amplitude modulated signal, such that significant noise is not induced in the demodulated output signal, and ripples are not induced in the demodulated output signal.

Apparatus 300 includes a first receiver 302 that is operable to receive an excitation signal, a second receiver 304 that is operable to receive an amplitude modulated signal, modulated by the position of an object, an analog to digital converter 306 that is operable to sample the excitation signal and the amplitude modulated signal at exactly the same times when the excitation signal is non-zero, a micro-controlled 308 that is operable to divide the amplitude modulated signal by the excitation signal, and further operable to output a signal that is proportional to the position of the object being sensed, a sync squared block 310 that is operable to generate a square wave that is exactly in phase with the excitation signal, a reference signal block 312 which normalizes the excitation signal and amplitude modulated signal to lie within a particular range, and an output buffer block 314 which stores the demodulated output signal.

In some aspects the sync squared block includes a circuit that generates a square wave synchronized with the excitation signal. The square wave is an input to the micro-controller.

In some aspects the micro-controller is operable to use the square wave signal from the sync squared block to determine the appropriate sampling times corresponding to the peaks of the excitation signal. The micro-controller reads the square wave signal from the sync squared block and determines the frequency of the excitation signal, and uses the frequency to delay the sampling of the excitation signal and amplitude modulated signal in order to sample the signal at the time corresponding to the peak in the excitation signal. Sampling at the times close to the peak in the excitation signal prevents the sampled excitation value from being zero which would make the demodulated output signal unstable.

In other aspects, the sampling of the excitation signal is performed several times and the average value of the samples is used as the value of the sampled excitation signal, and the sampling of the amplitude modulated signal is performed several times and the average value of the samples is used as the value of the sampled amplitude modulated signal.

Figure 4:
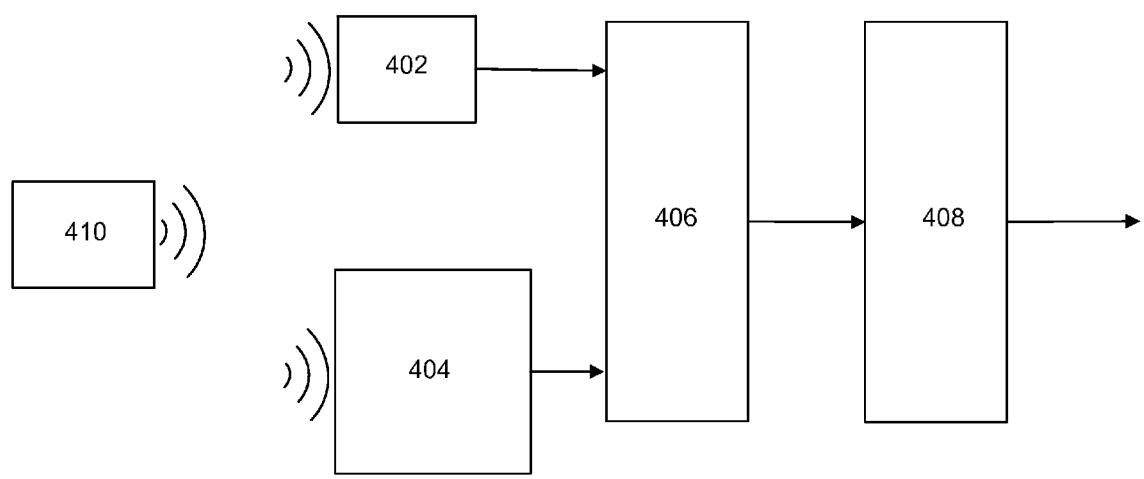
FIG. 4 is a cross section block diagram of an apparatus to sense the position of an object, such that the output signal is insensitive to variations due to an air gap between a source of an excitation signal and the object being sensed.

FIG. 4 is a cross section block diagram of an apparatus 400 to sense the position of an object, such that the output signal is insensitive to variations due to an air gap between a source of an excitation signal and the object being sensed. Apparatus 400 solves the need in the art to sense the position of an object demodulating an amplitude modulated signal, modulated by the position of the object being sensed, such that the demodulated output signal is insensitive to variations in the amplitude of an excitation signal due to an air gap between a source of the excitation signal and the object being sensed.

Apparatus 400 includes a receiver 402 that is operable to receive a received excitation signal, a position sensing device 404, an analog to digital converter 406 that is operable to sample the received excitation signal and an amplitude modulated signal, modulated by the position of an object being sensed, at exactly the same times when the received excitation signal is non-zero, a micro-controlled 408 that is operable to divide the amplitude modulated signal by the received excitation signal, and further operable to output a signal that is proportional to the position of the object being sensed, and an excitation coil 410 that is free to move relative to the rest of the apparatus.

In some aspects, the excitation coil is operable to transmit a transmitted excitation signal to the receiver and to the position sensing device, and the receiver and the position sensing device are each operable to receive the received excitation signal.

In other aspects, the position sensing device is further operable to use the received excitation signal to output an amplitude modulated signal, modulated by the position of the object being sensed, and transmit the amplitude modulated signal to a demodulator, and the demodulator is operable to receive the amplitude modulated signal.

In other aspects, the demodulator includes an analog to digital converter that is operable to sample the received excitation signal and the amplitude modulated signal at exactly the same time when the received excitation signal is non-zero, and a micro-controller that is operable to divide the amplitude modulated signal by the received excitation signal. In other aspects, the analog to digital converter includes an analog to digital converter with a dual simultaneously sampled sample/hold circuit. This provides a method to sample and hold the received excitation signal and the amplitude modulated signal at the same moment in time.

In other aspects, the analog to digital converter is operable to sample the received excitation signal and amplitude modulated signal at times close to the time corresponding to the peak amplitude of the received excitation signal. As a result the signal to noise ratio in the samples is reduced since the rate of change of an arbitrary sinusoidal signal is less at or near the peak of the arbitrary sinusoidal signal.

In other aspects, the demodulator includes a sync squared block that is operable to generate a square wave that is exactly in phase with the received excitation signal. In other aspects, the micro-controller is operable to use the square wave generated by the sync squared block to determine the appropriate sampling times corresponding to the peaks of the received excitation signal. In other aspects, the sampling of the excitation signal is performed several times and the average value of the samples is used as the value of the sampled excitation signal, and the sampling of the amplitude modulated signal is performed several times and the average value of the samples is used as the value of the sampled amplitude modulated signal.

In some aspects, the position sensing device includes a single coil absolute position sensor. In yet other aspects, the position sensing device includes an inductive gap sensor.

Figure 5:
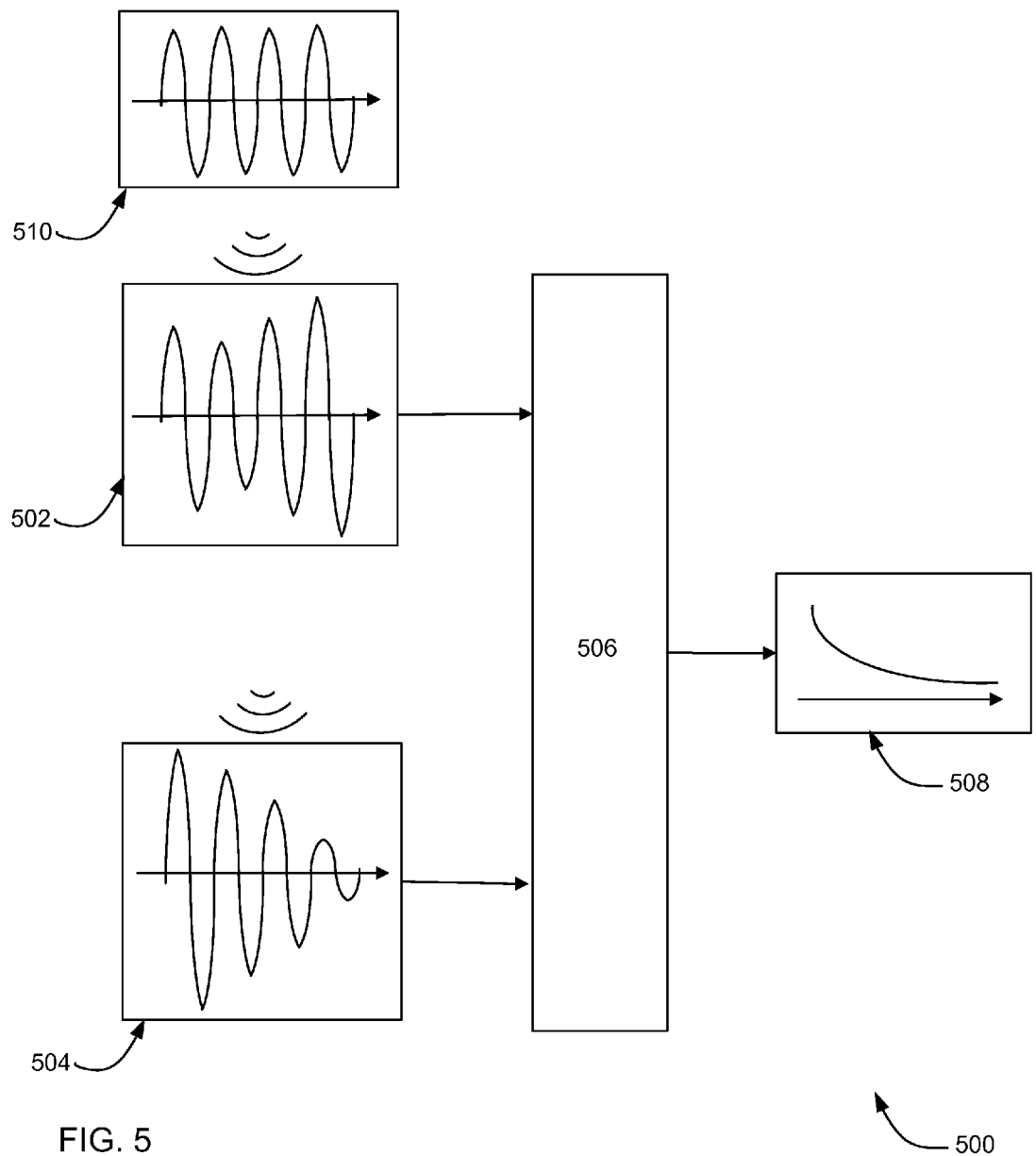
FIG. 5 is a cross section block diagram of an apparatus to sense the position of an object by demodulating an amplitude modulated signal, modulated by the position of the object being sensed.

FIG. 5 is a cross section block diagram of an apparatus 500 to sense the position of an object by demodulating an amplitude modulated signal, modulated by the position of the object being sensed. Apparatus 500 solves the need in the art to sense the position of an object by demodulating an amplitude modulated signal, modulated by the position of the object being sensed, such that the demodulated output signal is insensitive to variations in the amplitude of an excitation signal due to an air gap between a source of the excitation signal and the object being sensed, and such that significant noise is not induced in the demodulated output signal, and ripples are not induced in the demodulated output signal.

Apparatus 500 includes a receiver 502 that is operable to receive a received excitation signal, a position sensing device 504 that is operable to receive the received excitation signal and output an amplitude modulated signal, modulated by the position of an object, a demodulator 506 that is operable to demodulated the amplitude signal from the received excitation signal, and is further operable to output a signal that is proportional to the position of the object, an output buffer 508 that is operable to receive the demodulated output signal that is proportional to the position of the object being sensed, and an excitation coil 510 that is free to move relative to the rest of the apparatus.

In some aspects, the transmitted excitation signal is a constant frequency periodic signal, and in other aspects, the transmitted excitation signal is a constant frequency sinusoidal signal of the form K*Sin(wt), where K is a constant value, w is the frequency of the sinusoidal signal, t is a variable representing time, and Sin(•) represents the sinusoidal function applied to the arguments within the parentheses.

In some aspects, the amplitude modulated signal is a constant frequency periodic signal modulated whose amplitude is modulated by the position of an object being sensed. In other aspects, the amplitude modulated signal is a constant frequency sinusoidal signal whose amplitude is modulated by the position of an object being sensed, where the amplitude modulated signal is of the form K1(t)*K*Sin(wt), where K1(t) is the position of the object being sensed, K is a constant value, w is the frequency of the sinusoidal signal, t is a variable representing time, and Sin(•) represents the sinusoidal function applied to the arguments within the parentheses.

In other aspects, the received excitation signal is a constant frequency sinusoidal signal that has been degraded by noise due to the air gap between the excitation coil and the receiver, and due to the excitation coil and the position sensing device, where the received excitation signal is of the form K(t)*Sin(wt), where K(t) is the noise due to the air gap, w is the frequency of the sinusoidal signal, t is a variable representing time, and Sin(•) represents the sinusoidal function applied to the arguments within the parentheses.

In other aspects, the amplitude modulated signal is a constant frequency sinusoidal signal that has been degraded due to noise, whose amplitude is modulated by the position of an object being sensed, where the amplitude modulated signal is of the form K1(t)*K(t)*Sin(wt), where K1(t) is the position of the object being sensed, K(t) is the noise due to the air gap, w is the frequency of the sinusoidal signal, t is a variable representing time, and Sin(•) represents the sinusoidal function applied to the arguments within the parentheses.

In some aspects, determining the position of the object being sensed includes determining the value of K1(t) by using a demodulator circuit to divide the amplitude modulated signal by the received excitation signal resulting in a normalized, ripple free signal that is proportional to the position of the object being sensed.

Method Embodiments

In the previous section, apparatus of the operation of an implementation was described. In this section, the particular methods performed by the various constituents of such an implementation are described by reference to a series of flowcharts.

Figure 6:
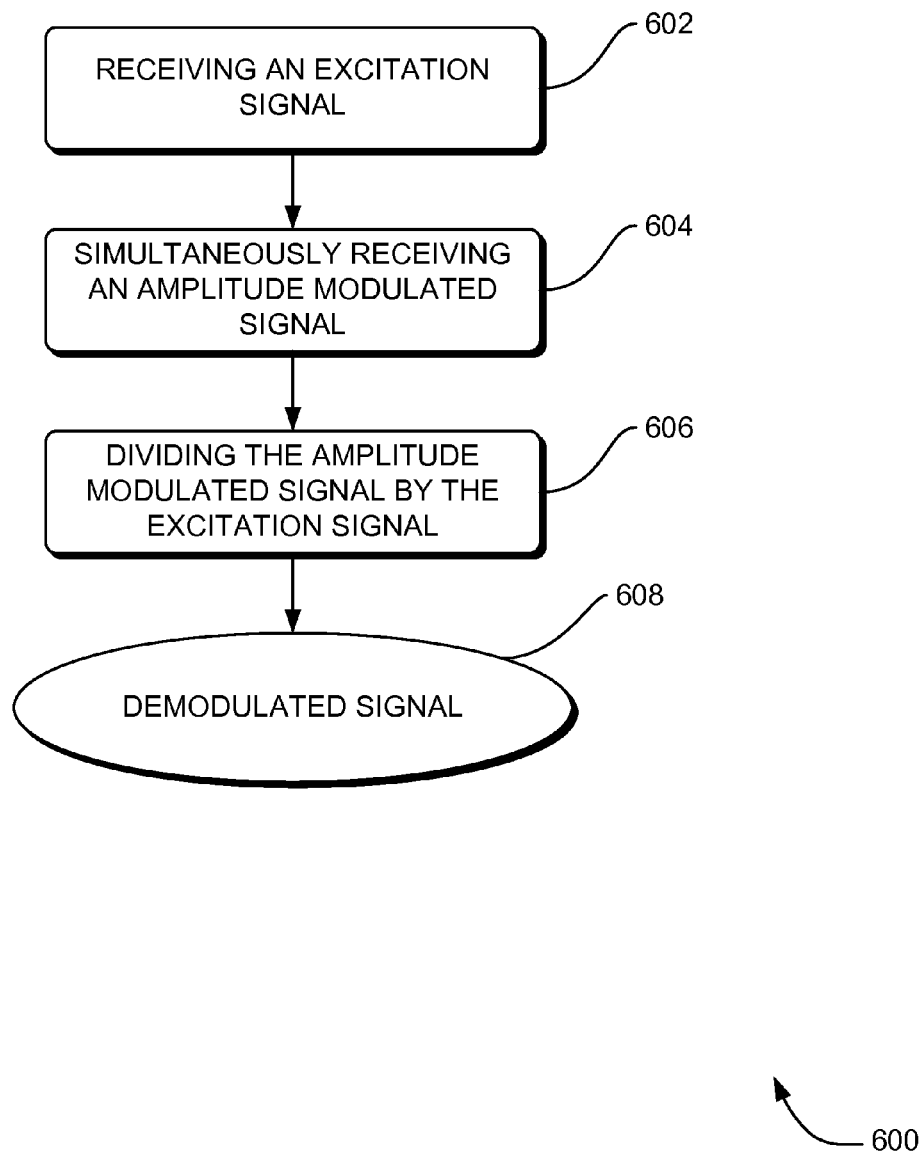
FIG. 6 is a flowchart of a method to demodulate an amplitude modulated signal according to an implementation.

FIG. 6 is a flowchart of a method 600 to demodulate an amplitude modulated signal according to an implementation. Method 600 solves the need in the art to provide a method to sense the position of an object by demodulating an amplitude modulated signal, such that significant noise is not induced in the demodulated output signal, and ripples are not induced in the demodulated output signal.

Method 600 includes receiving an excitation signal 602, receiving an amplitude modulated signal 604, modulated by the position of the object being sensed, dividing the amplitude modulated signal by the excitation signal 606, and producing a demodulated signal that is proportional to the position of the object being sensed.

Figure 7:
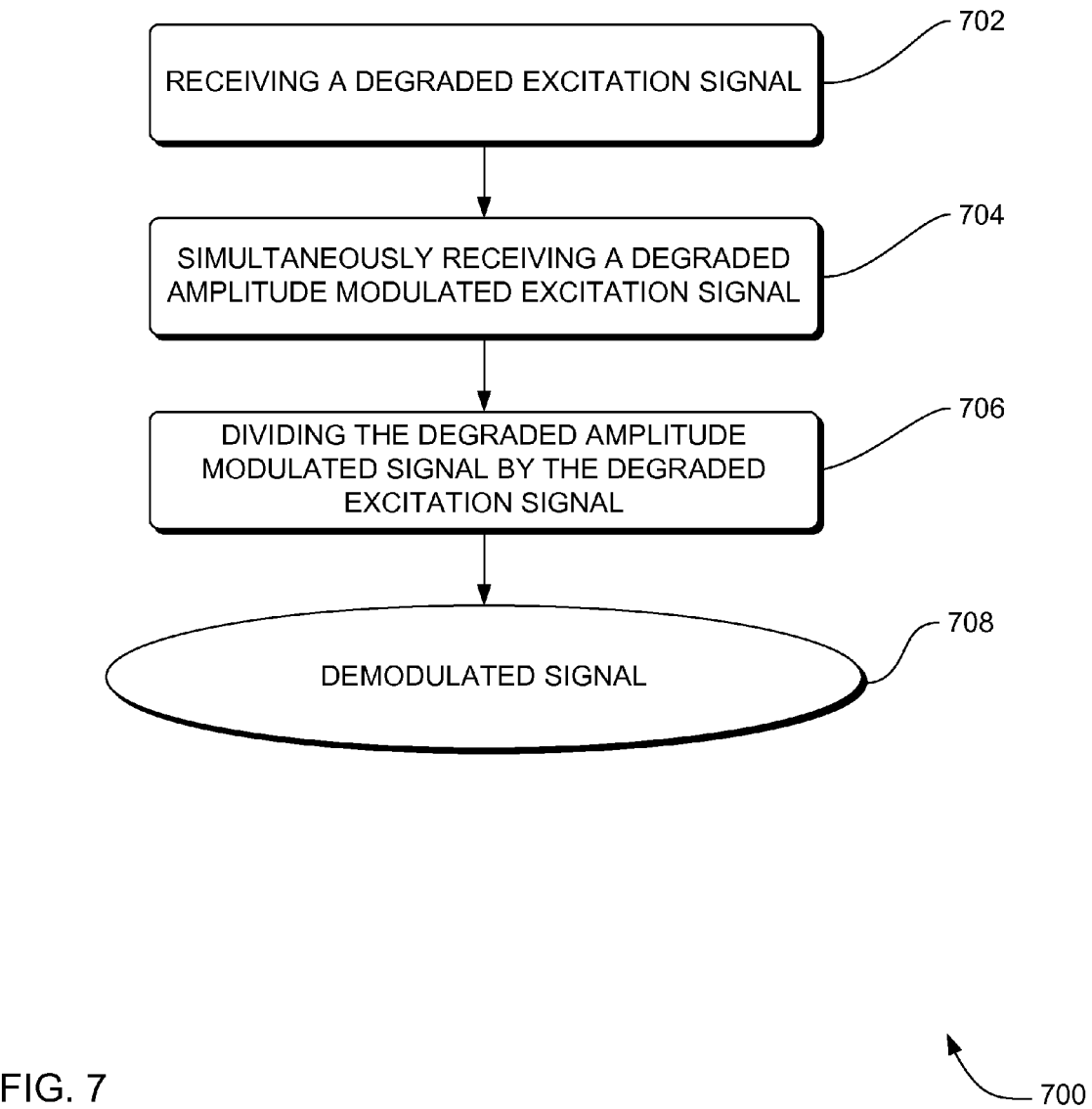
FIG. 7 is a flowchart of a method to demodulate a degraded amplitude modulated signal according to an implementation.

FIG. 7 is a flowchart of a method 700 to demodulate a degraded amplitude modulated signal according to an implementation. Method 700 solves the need in the art to provide a method to sense the position of an object by demodulating a degraded amplitude modulated signal, modulated by the position of the object being sensed, such that the demodulated output signal is insensitive to the degradation of the amplitude modulated signal.

Method 700 includes receiving a degraded excitation signal 702, receiving an amplitude modulated degraded excitation signal 704, modulated by the position of the object being sensed, dividing the degraded amplitude modulated signal by the degraded excitation signal 706, and producing a demodulated output signal that is proportional to the position of the object being sensed and insensitive to the degradation of the excitation signal and amplitude modulated signal.

In some implementations, methods 600-700 are implemented as a computer data signal embodied in a carrier wave, that represents a sequence of instructions which, when executed by a processor, cause the processor to perform the respective method. In other implementations, methods 600-700 are implemented as a computer-accessible medium having executable instructions capable of directing a processor, to perform the respective method. In varying implementations, the medium is a magnetic medium, an electronic medium, or an optical medium.

CONCLUSION

An apparatus through which an amplitude modulated signal, modulated by the position of an object being sensed, is demodulated such that the apparatus is insensitive to variations in the amplitude of an excitation signal, does not induce significant noise in the demodulated signal due to extensive stages of electronics to process the signals, and does not induce ripples in the demodulated output signal is described. A technical effect of the demodulation system is to detect the absolute position of an object by producing an output signal which is proportional to the position of the object being sensed. Although specific implementations are illustrated and described herein, it will be appreciated by those of ordinary skill in the art that any arrangement which is calculated to achieve the same purpose may be substituted for the specific implementations shown. This application is intended to cover any adaptations or variations. For example, although described in terms of an electronic circuit, one of ordinary skill in the art will appreciate that implementations can be made in firmware, software or other electronic circuits that provides the required function.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future position sensing devices, and different methods of sensing the position of object based on demodulating an amplitude modulated signal.

The terminology used in this application meant to include all demodulator circuits, analog to digital converters, microcontrollers, receiver and transmitter environments and alternate technologies which provide the same functionality as described herein.

We claim:

1. An apparatus to sense the position of an object, the apparatus comprising:
   a first receiver operable to receive an excitation signal;
   a second receiver operable to receive an amplitude modulated signal, modulated by a position of the object being sensed; and
   a demodulator operable to demodulate the amplitude modulated signal from the received excitation signal and operable to output a signal that is proportional to the position of the object being sensed,
   wherein the demodulator further comprises:
      an analog to digital converter; and
      a micro-controller;
      wherein the analog to digital converter is operable to sample the excitation signal and the amplitude modulated signal at exactly the same times when the excitation signal is non-zero, and the micro-controller divides the amplitude modulated signal by the excitation signal.

2. The apparatus of claim 1, wherein the analog to digital converter is operable to sample the excitation and amplitude modulated signals at the time corresponding to the peak amplitude of the excitation signal.

3. The apparatus of claim 2 further comprising:
   a sync squared block;
   wherein the sync squared block is operable to generate a square wave signal that is exactly in phase with the excitation signal.

4. The apparatus of claim 3, wherein the micro-controller is operable to use the square wave signal to determine the appropriate sampling time corresponding to the peaks of the excitation signal.

5. The apparatus of claim 4 wherein the sampling is performed several times and an average value of the ratio is computed and used as the output signal.

6. The apparatus of claim 5, wherein the analog to digital converter further comprises an analog to digital converter selected from the group consisting of an 8 bit analog to digital converter, a 12 bit analog to digital converter, a 16 bit analog to digital converter, a 24 bit analog to digital converter and a 32 bit analog to digital converter.

7. The apparatus of claim 6, wherein the received excitation signal comprises:
   a sinusoidal wave of constant frequency.

8. An apparatus to sense the position of an object, the apparatus comprising:
   a receiver operable to receive an excitation signal;
   a position sensing device;
   a demodulator operable to demodulate the amplitude modulated signal from the received excitation signal and operable to output a signal that is proportional to the position of the object being sensed;
   an excitation coil;
   wherein the excitation coil is free to move relative to the rest of the apparatus,
   wherein the excitation coil is further operable to transmit a transmitted excitation signal to the position sensing device and to the receiver, and the position sensing device and the receiver are each operable to receive a received excitation signal,
   wherein the position sensing device is further operable to output the amplitude modulated signal, modulated by the position of the object being sensed, and transmit the amplitude modulated signal to the demodulator, and the demodulator is further operable to receive the amplitude modulated signal,
   wherein the demodulator further comprises:
      an analog to digital converter; and
      a micro-controller;
      wherein the analog to digital converter is operable to sample the excitation signal and the amplitude modulated signal at exactly the same times when the excitation signal is non-zero, and the micro-controller divides the amplitude modulated signal by the excitation signal.

9. The apparatus of claim 8, wherein the analog to digital converter is operable to sample the excitation and amplitude modulated signals at the time corresponding to the peak amplitude of the excitation signal.

10. The apparatus of claim 9 further comprising:
    a sync squared block;
    wherein the sync squared block is operable to generate a square wave signal that is exactly in phase with the excitation signal.

11. The apparatus of claim 10, wherein the micro-controller is operable to use the square wave signal to determine the appropriate sampling time corresponding to the peaks of the excitation signal.

12. The apparatus of claim 11 wherein the sampling is performed several times and an average value of the ratio is computed and used as the output signal.

13. The apparatus of claim 12, wherein the analog to digital converter further comprises an analog to digital converter selected from the group consisting of an 8 bit analog to digital converter, a 12 bit analog to digital converter, a 16 bit analog to digital converter, a 24 bit analog to digital converter and a 32 bit analog to digital converter.

14. The apparatus of claim 13, wherein the position sensing device further comprises:
    a single coil absolute position sensor (SCAPS).

15. The apparatus of claim 13, wherein the position sensing device further comprises:
    an inductive gap sensor (GAPSYN).

16. The apparatus of claim 13, wherein the transmitted excitation signal comprises:
    a sinusoidal wave of constant frequency.

17. The apparatus of claim 13, wherein the received excitation signal comprises:
    a sinusoidal wave of constant frequency, which has been degraded due to the air gap between the excitation coil and the position sensing device.

18. A method to determine the position of an object comprising:
    receiving an excitation signal;
    receiving an amplitude modulated signal, modulated by the position of the object; and
    demodulating the amplitude modulated signal by dividing the amplitude modulated signal by the excitation signal to produce a signal proportional to the position of the object.

19. The method of claim 18, the method further comprising:
    receiving the excitation signal from a source that is free to move relative to the rest of the apparatus; and
    receiving the amplitude modulated signal from a source that is not free to move relative to the rest of the apparatus.

20. The method of claim 19, wherein receiving the excitation signal further comprises:
    receiving a signal that has been degraded due to the air gap between the excitation signal source and the rest of the apparatus.

21. The method of claim 20, wherein receiving the amplitude modulated signal further comprises:
   receiving an amplitude modulated degraded excitation signal, modulated by the position of the object being sensed.

22. The method of claim 21, wherein the demodulating further comprises:
   dividing the amplitude modulated degraded excitation signal by the degraded excitation signal to produce an output signal that is insensitive to degradation of the excitation signal.

* * * * *